US011200218B2

(12) United States Patent
Antonatos et al.

(10) Patent No.: US 11,200,218 B2
(45) Date of Patent: Dec. 14, 2021

(54) PROVIDING CONSISTENT DATA MASKING USING CAUSAL ORDERING

(71) Applicant: INTERNATIONAL BUSINESS MACHINES CORPORATION, Armonk, NY (US)

(72) Inventors: Spyridon Antonatos, Dublin (IE); Stefano Braghin, Dublin (IE); Naoise Holohan, Dublin (IE); Pol MacAonghusa, Carbury (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

(21) Appl. No.: 16/386,586

(22) Filed: Apr. 17, 2019

(65) Prior Publication Data

US 2020/0334219 A1    Oct. 22, 2020

(51) Int. Cl.
*G06F 16/22* (2019.01)
*G11C 7/10* (2006.01)
*G06F 21/62* (2013.01)
*G06F 16/21* (2019.01)

(52) U.S. Cl.
CPC ........ *G06F 16/2255* (2019.01); *G06F 16/211* (2019.01); *G06F 16/2272* (2019.01); *G06F 21/6218* (2013.01); *G06F 21/6254* (2013.01); *G11C 7/1009* (2013.01); *H04L 2209/38* (2013.01)

(58) Field of Classification Search
CPC .............. G06F 16/211; G06F 16/2255; G06F 16/2272; G06F 21/6218; G06F 16/2228; G06F 21/6245; G06F 21/6254; G11C 7/1009; H04L 2209/38
See application file for complete search history.

(56) References Cited

U.S. PATENT DOCUMENTS

| | | |
|---|---|---|
| 8,306,932 B2 | 11/2012 | Saxena et al. |
| 8,452,619 B2 | 5/2013 | Kenedy et al. |
| 9,135,315 B2 | 9/2015 | Barbas et al. |
| 9,519,801 B2 | 12/2016 | Wilding |
| 9,621,680 B2 | 4/2017 | D'Costa et al. |
| 9,911,003 B2 | 3/2018 | Farkash et al. |
| 2017/0169246 A1 | 6/2017 | Ould-Ahmed-Vall et al. |
| 2017/0337386 A1 | 11/2017 | Kumaresan et al. |
| 2017/0344495 A1 | 11/2017 | Antonatos et al. |
| 2017/0364698 A1* | 12/2017 | Goldfarb ............... H04L 9/3239 |
| 2018/0173897 A1 | 6/2018 | Mushkatblat |
| 2018/0218166 A1 | 8/2018 | Cachin et al. |
| 2018/0253562 A1 | 9/2018 | Antonatos et al. |

(Continued)

OTHER PUBLICATIONS

"Fast dictionary learning from incomplete data" Naumova and Schnass EURASIP, Journal on Advances in Signal Processing (2018) ( 21 Pages) https://doi.org/10.1186/s13634-018-0533-0.

(Continued)

*Primary Examiner* — Olugbenga O Idowu
(74) *Attorney, Agent, or Firm* — Griffiths & Seaton PLLC

(57) ABSTRACT

Embodiments for performing consistent data masking in a distributed computing environment by a processor. A dictionary based data masking operation is performed on one or more datasets with causal ordering of the one or more datasets to enable reconstruction of a state of the one or more dictionaries for the one or more datasets.

14 Claims, 9 Drawing Sheets

WE ADD A NEW DICTIONARY ENTRY D:

(56) References Cited

U.S. PATENT DOCUMENTS

2020/0044863 A1* 2/2020 Yadlin ..................... H04L 9/085
2020/0235911 A1* 7/2020 Safak .................... H04L 9/3239

OTHER PUBLICATIONS

"Understanding and Selecting Data Masking Solutions: Creating Secure and Useful Data" Aug. 10, 2012, Securosis, L.L.C. ( 32 Pages).
"Causal Consistent Databases" Mawahib Musa Elbushra, College of Graduate Studies, Sudan University of Science and Technology, Open Journal of Databases (OJDB) vol. 2, Issue 1, 2015 ( 35 Pages).
"Application of Data Masking Techniques for Data Testing and Its Comparison Study for Business Critical Domains" Ravikumar G.K. Department of Information Technology Dr. M.G.R. Educational and Research Institute University, Feb. 2012 ( 131 Pages).

* cited by examiner

PROVIDING CONSISTENT DATA MASKING USING CAUSAL ORDERING

BACKGROUND OF THE INVENTION

Field of the Invention

The present invention relates in general to computing systems, and more particularly to, various embodiments for performing consistent data masking in a distributed computing environment using one or more computing processors.

Description of the Related Art

Computing systems may be found in the workplace, at home, or at school. Computer systems may include data storage systems, or disk storage systems, to process and store data. For example, many businesses, organizations, educational institutions, or governmental agencies need to share data with various constituents for a variety of business, educational, and/or governmental purposes, while also protecting sensitive or identifiable aspects of the information.

As the technology field grows exponentially each year, an ever-growing amount of critical data are generated, collected and shared by individuals and organizations. Consequently, the need for advancement in the techniques for efficiently and consistently protecting the privacy of the individuals represented by such data is paramount. At the same time, it is of great importance to preserve as much information as possible in order to preserve the business value of the data itself.

SUMMARY OF THE INVENTION

Various embodiments for performing consistent data masking in a distributed computing environment by a processor, are provided. In one embodiment, by way of example only, a method for performing consistent data masking in a distributed computing environment, again by a processor, is provided. A dictionary based data masking operation is performed on one or more datasets with causal ordering of the one or more datasets to enable reconstruction of a state of the one or more dictionaries for the one or more datasets.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As described herein, a data masking operation may be the process whereby the information, data, and/or data in a database is masked or de-identified to ensure the protection of sensitive information while protecting the utility of the data without risk of unnecessarily exposing sensitive information. That is, data masking may be a process of obscuring (masking) specific data elements within a data store. Data masking may enable data to be replaced with realistic but not real data. In one aspect, data masking may obscure sensitive data in order that sensitive data is not available outside of the authorized environment. Data masking may be performed while provisioning non-production environments, so that data used to support test and development processes are not exposing sensitive data. In short, data masking may include creating a structurally similar version of data that cannot be linked to the original data and that may be used for one or more purposes, such as, for example, application training and/or training. Data masking may protect actual data while having the functional substitute of the actual data when the actual data is not needed.

In one aspect, data masking may be an operation for privacy-preserving data sharing. Consistent data masking maximizes utility of the masked dataset as it preserves better its statistical value. Consistent data masking may be masking data objects consistently across a plurality of different data resources to protect privacy.

Also, data masking may be performed in a single-machine computing environment or may support predefined masking operations in distributed environments in order to ensure consistency. However, current data masking operations that use dictionaries fail to provide consistent masking. Thus, if dictionaries are used for consistent masking, future updates may lead to inconsistent results and this limits the number of masking operations that can be applied.

Accordingly, various embodiments provide a solution for performing dictionary-based consistent masking of a dataset using causal ordering in a distributed environment, where multiple workers (e.g., execution threads, concurrent programs, etc.) are enabled to use causal ordering to reconstruct the state of data dictionaries. The workers may be execution processes (either on the same machine, thus executing on different processors, or on different machines) reading/writing on the same dictionary. The present invention may use dictionaries to perform de-identification of original values that have been data asked. Although the dictionaries can change over time with newer entries appearing and old entries disappearing, the present invention may store and maintain each state of each dictionary. In this way, the present invention may rely on the order and size of the dictionaries without breaking consistency when new/update entry are added/edited to the dictionaries. Said differently, the present invention may provide causal ordering by saving, maintaining, and using the state of dictionaries. The state of each dictionary may be used to reconstruct prior/subsequent operations. Accordingly, mechanisms of the illustrated embodiments perform consistent dictionary-based data masking in a distributed fashion by providing causal ordering.

In one aspect, the data masking of the data set may be a dictionary of values that may be indexed. That is, the dictionary (e.g., masked data values that are indexed) may be stored as an in-memory structure or as a file, and in both variations, the initial indexing is the same. The causal order of the dictionary may be provided by the state of each indexed, masked data value (e.g., a "random" function, a "hash" function) that may be used to generate the dictionary representing each masked data value. The dictionary referred to herein may be a set of dictionaries utilized for the purposes of consistent data masking using causal ordering as appropriate and as is described in additional detail below. Further still, the dictionary and masked dictionary may constitute a set of dictionaries utilized for one or more databases (e.g., a blockchain database, a centralized database, and/or distributed database).

In an additional aspect, the present invention performs consistent data masking in a distributed computing environment such as, for example in a blockchain. A dictionary based data masking operation may be performed on one or more datasets with causal ordering of the one or more datasets to enable reconstruction of a state of the one or more dictionaries for the one or more datasets.

In another aspect, the present invention provides a state keeper component and a masking components. The state keeper component may be responsible for maintaining each state of each dictionary that provides causal ordering. The masking component may reconstruct the state of each dictionary and provides the correct dictionary (according to the state of each dictionary) for each masked value. The correct dictionary means a valid state of the dictionary that can be agreed upon by the various workers operating on the dictionary. That is, a sequence of operations transforming such dictionary that are not ambiguous given their respect causal order. The state keeper may store three different types of information. First, a state keeper may store when a dictionary entry was inserted (e.g., "type I") along with its value in the dictionary. Second, the state keeper may store when a dictionary entry was deleted (e.g., "type D") from the dictionary. Third, the state keeper may store when a value was first masked (type V). The state keeper enters, maintains, and stores the information at the same order as the events occur (e.g., data masking of data). In one aspect, a dictionary may be in the data structure sense. In practice, the dictionary may be implemented in several ways such as, for example, either implemented as a database table or a blockchain. However, it should be noted that a blockchain requires the previously described protocol to be enabled, while a standard relational database management system ("RDBMS") has inherently the ability to provide causal ordering.

The masking component may consult a reconstructed dictionary (e.g., the state keeper) whenever a value needs to be masked. (The dictionary may be reconstructed from the state keeper/storing device. In this sense, the blockchain and the wring protocol is an embodiment of a state keeper.) If the value is found in the state keeper, then the dictionary is reconstructed based on the type I blocks (e.g., dictionary entry value and state/time of entry in the dictionary) and type D blocks (e.g., state/time of deletion of a dictionary entry) prior to the block of the value ("V"). If the value is not found in the state keeper, the entire set of type I and type D blocks are used and a new type V block is appended to the reconstructed dictionary (e.g., dictionary such as, for example, a blockchain) storing a representation of the value. The dictionary reconstruction may be performed according to the order of type I and type D events as they exist on the system.

In an additional aspect, the present invention may use a blockchain such as, for example, a fork-less blockchain. The blockchain provides provenance and works natively in distributed environments. A hyperledger fabric may be used, which is a fork-less blockchain system. The hyperledger further leverages privileges of the blockchain nodes to simplify the consensus algorithms (e.g., removing the need of a consensus algorithm in most use cases). Additionally, one or more databases that support transactions may also be sued. Each action of the present invention may be translated into a transaction, which the database will reconciliate to provide consistent view of the data. The transaction database may be a centralized database and/or a distributed database.

In this way, the present invention provides increased efficiency for consistent data masking that guarantee causal ordering and provably provide consistent results even in the presence of updates and/or deletions in a dictionary. The state of the dictionaries that needs to be maintained is proportional to the cardinality of distinct values of the data that needs to be masked and the dictionary size. The present invention may be used and applied to a distributed computing environment where multiple workers perform data masking based on the same set of dictionaries such as, for example, data masking performed by an Internet of Things ("IoT") devices, edge computing devices, and/or operations in which data masking is performed while processing large volumes of data such as, for example, in a map-reduced framework such as, for example, a distributed file system ("DFS") or leverages a distributed execution engine (e.g., IBM® Apache Spark™) employing replication (e.g., Hadoop Distributed File System "HDFS") in order to process the dataset in a distributed fashion. The present invention may be used and applied in centralized computing environments.

It should also be noted that a blockchain is a distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
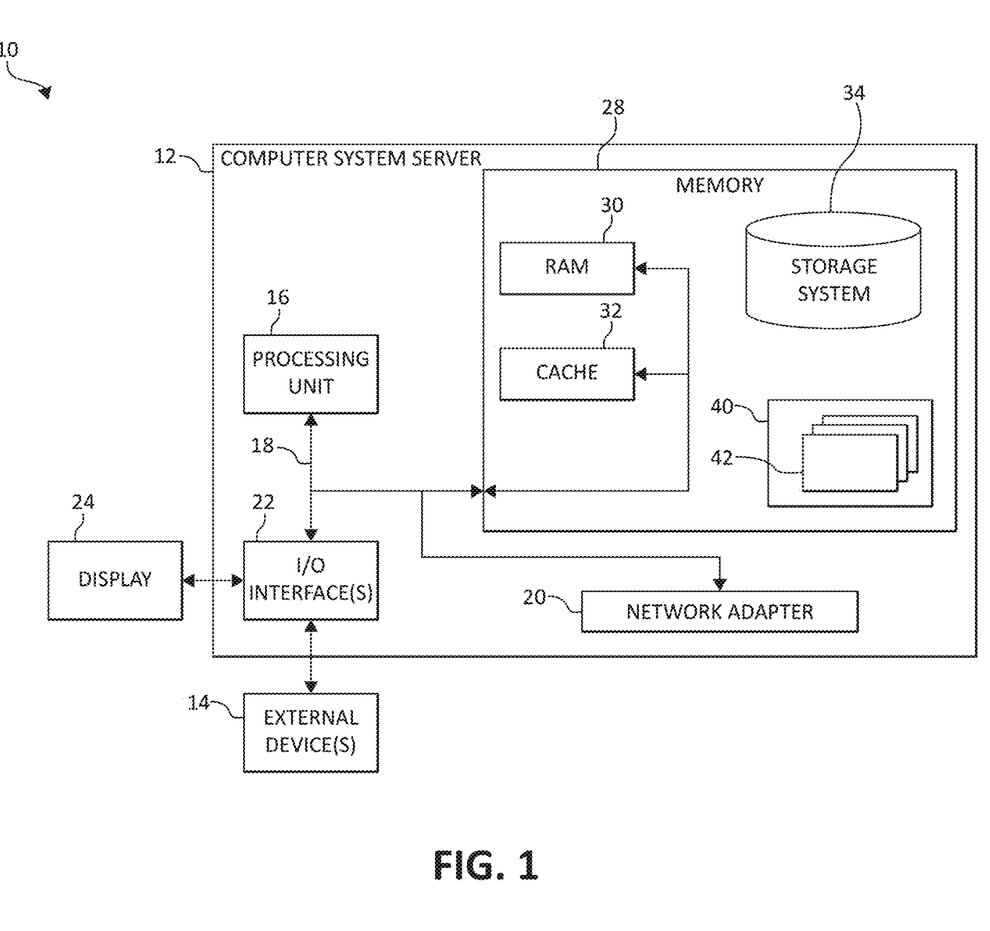
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
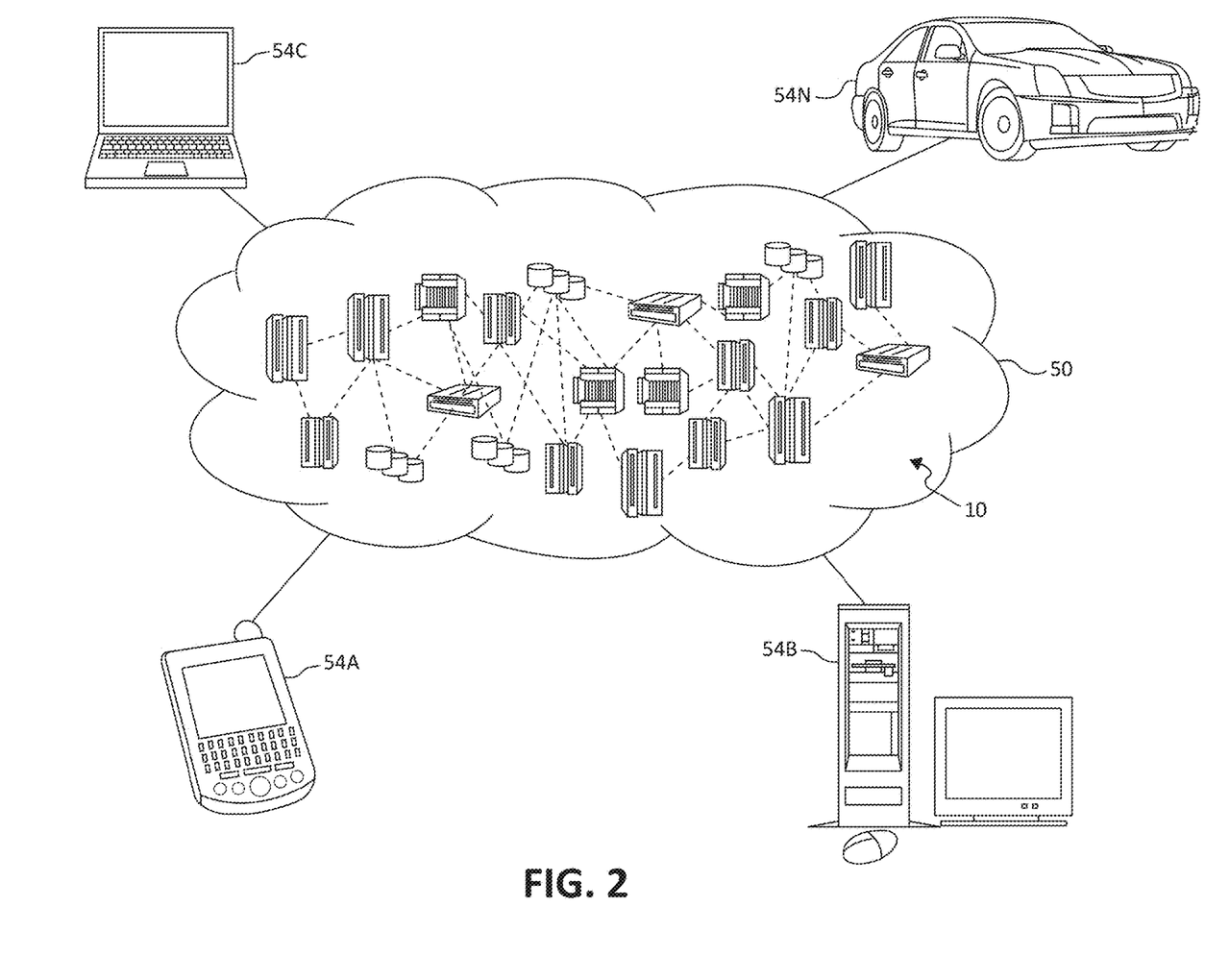
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
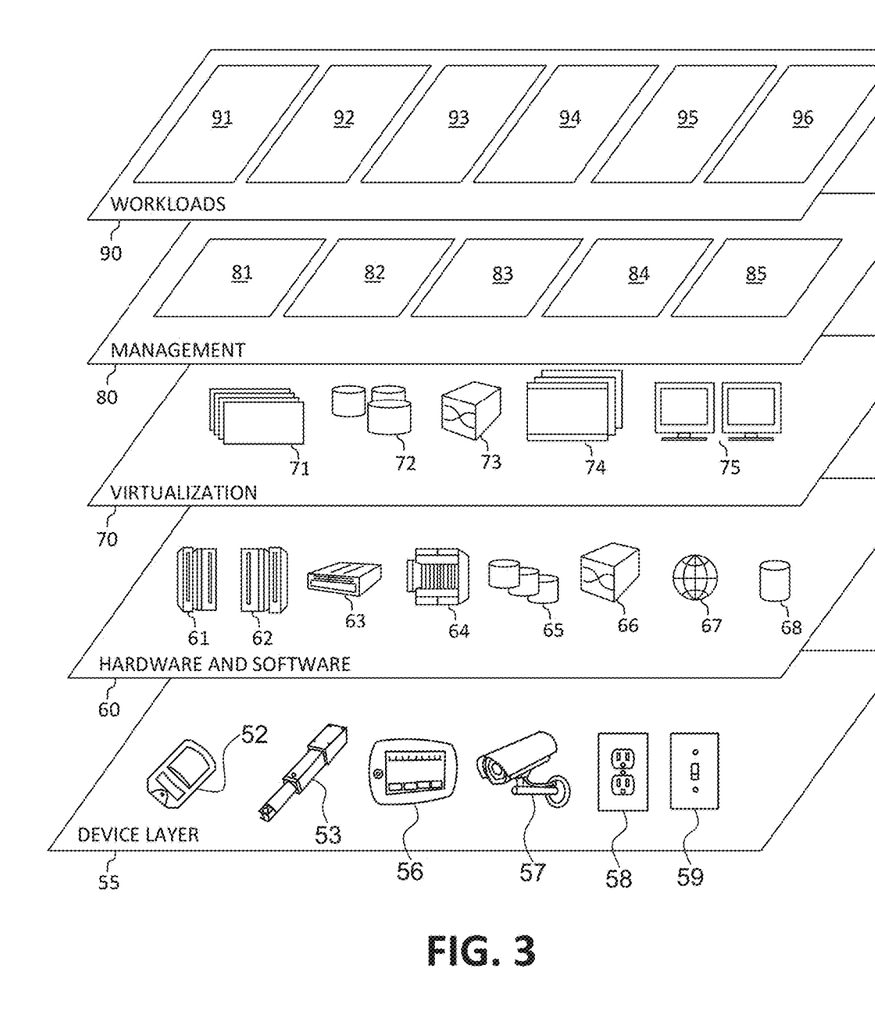
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various consistent data masking workloads and functions 96. In addition, consistent data masking workloads and functions 96 may include such operations as data analytics, data analysis, and as will be further described, notification functionality. One of ordinary skill in the art will appreciate that the consistent data masking workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
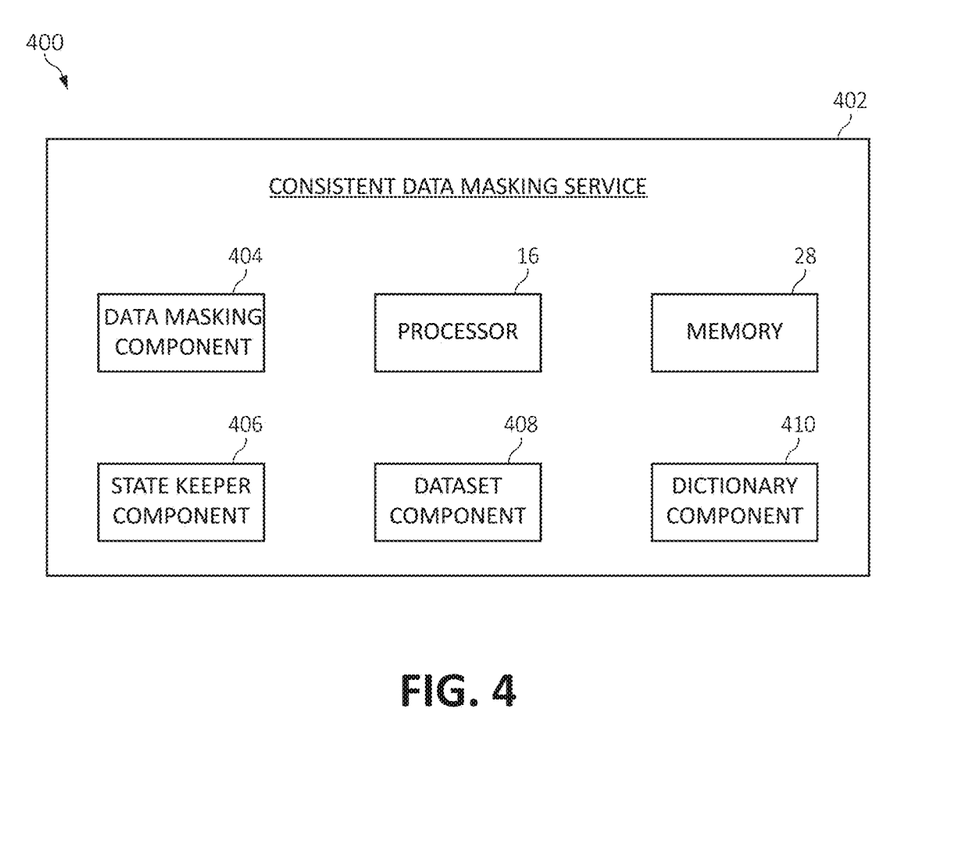
FIG. 4 is an additional block diagram depicting various user hardware and computing components functioning in accordance with aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as computer systems of vehicles) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16.

The computer system/server 12 of FIG. 1, may include consistent data masking service 402, along with other related components in order to apply data masking operations on datasets that may be in the form of records, objects, and/or documents, wherein each record or object or document may include values for a common set of columns or paths. The consistent data masking service 402 may perform data masking operations without using any deterministic or external mapping based services.

The data masking service 402 may include a data masking ("masking") component 404, a state keeper component 406, a dataset component 408, and a dictionary component 410.

The dataset component 408 may include one or more datasets. The datasets may be in one of a plurality of dataset formats such as, for example, records, objects, and/or documents, that may also include unique record, object, and/or document identifiers for each of the datasets.

The masking component 404 (e.g., data masking component) may perform a data masking operation (e.g., a dictionary based data masking operation) on one or more datasets with causal ordering of the one or more datasets to enable reconstruction of a state of the one or more dictionaries for the one or more datasets.

The data masking component 404 and/or the worker hreads may apply the dictionary based data masking operations on one or more datasets with causal ordering (for one or more datasets in a structured or unstructured format). Original values base values, predefined values, default values, and the like) may be substituted, by the masking component 404, in the records, objects, and/or documents (e.g., the one or more datasets in a structured or unstructured format) that are included as masked data values in each dictionary.

The state keeper component 406 may maintain the state of the one or more dictionaries for each masked data value of the one or more datasets. The state keeper component 406 may maintain for each of the one or more datasets in the one or more dictionaries a dictionary entry along with an associated data masking value, each deletion of the dictionary entry of the one or more datasets, the data masking value for each one of the one or more datasets indicating a time period of the data masking, or a combination thereof.

The data masking component 404, in association with the dictionary component 410, may reconstruct each state of the one or more dictionaries for each masked data value of the one or more datasets. The data masking component 404, in association with the dictionary component 410, may reconstruct each state of the one or more dictionaries according to a dictionary entry in the one or more dictionaries along with an associated data masking value for each of the one or more datasets, each deletion of the dictionary entry of the one or more datasets, and the data masking value for each one of the one or more datasets indicating a time period of the data masking. The data masking component 404, in association with the dictionary component 410, may store each masked data value in the one or more dictionaries as a cryptographic hash function, wherein the one or more dictionaries are transaction ledgers.

In one aspect, a blockchain system 412 may be in association with the consistent data masking service 402. That is, the blockchain system 412 may be a distributed database that may external to and/or internal to the consistent data masking service 402. The blockchain system 412 may be used for performing the dictionary based data masking operation on the one or more datasets with causal ordering of the one or more datasets.

Figure 5A:
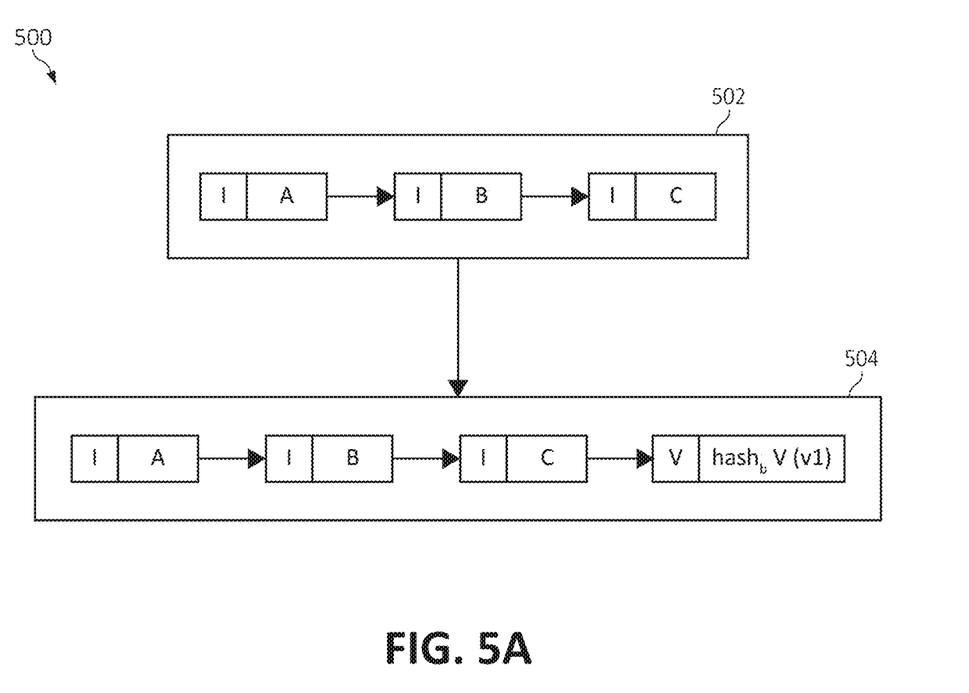
FIG. 5A-5C are additional block diagram depicting flow operations for achieving consistent dictionary based masking using causal ordering in accordance with aspects of the present invention.
Figure 5B:
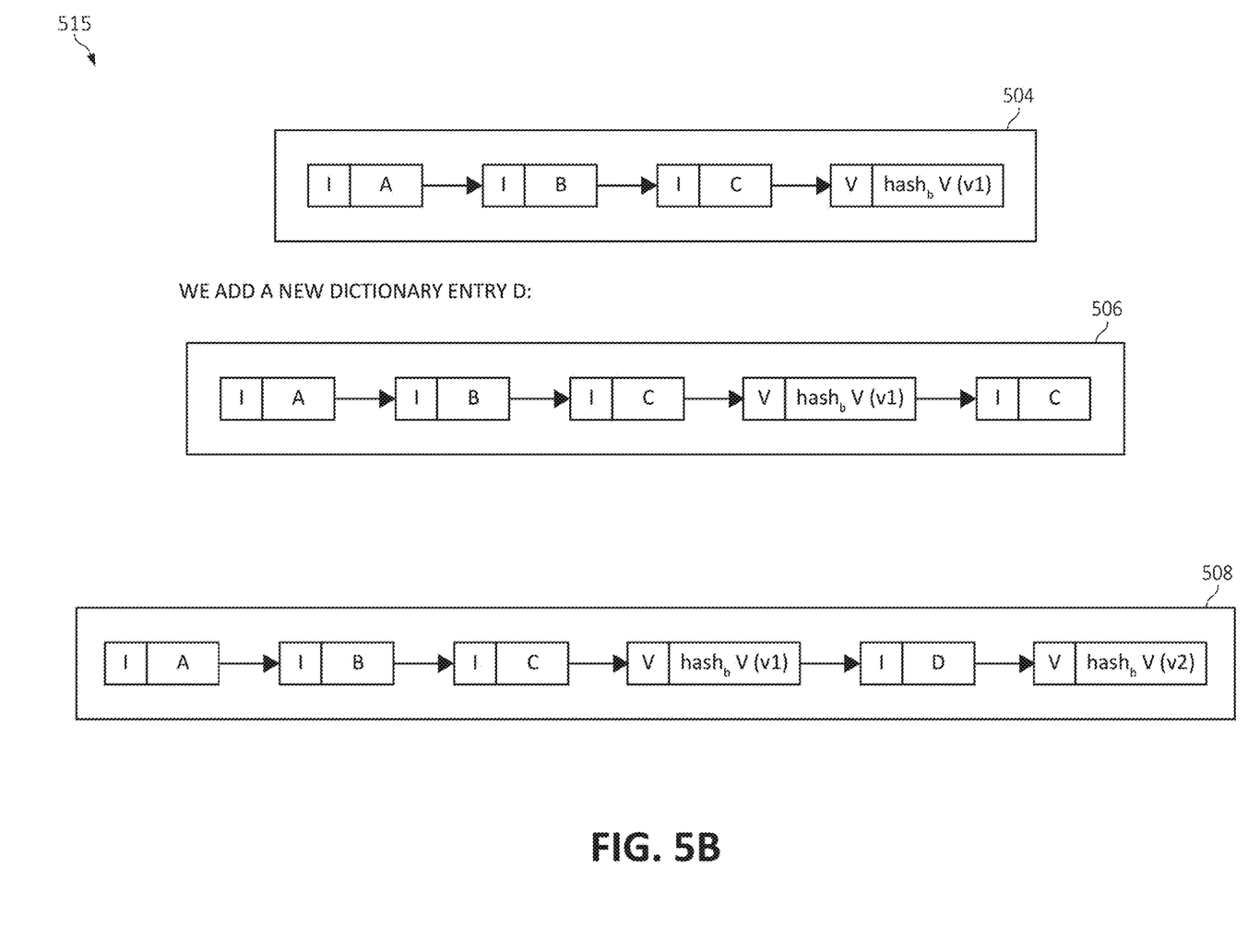
Figure 5C:
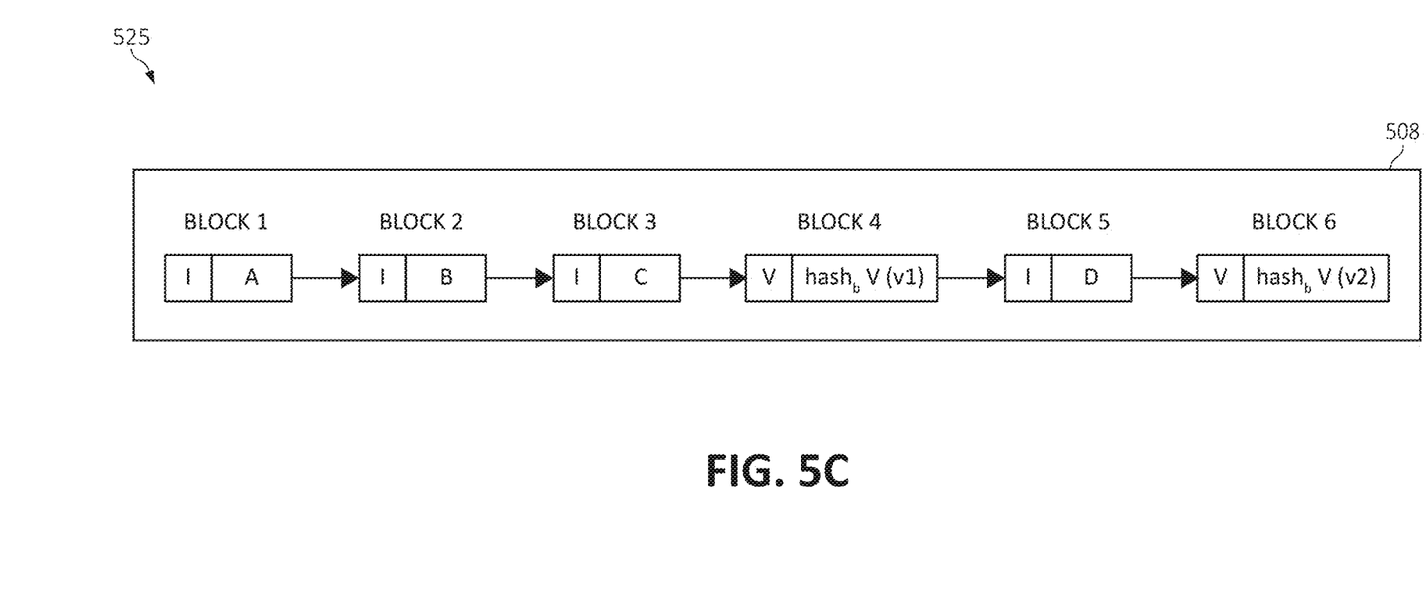

Turning now to FIGS. 5A-5C, a block diagram depict flow operations 500, 515, and 525 illustrating three examples for achieving consistent dictionary based masking using causal ordering. In one aspect, one or more of the components, modules, services, applications, and/or functions described in FIGS. 1-4 may be used in FIGS. 5A-5C. Repetitive description of like elements, components, modules, services, applications, and/or functions employed in other embodiments described herein is omitted for sake of brevity.

As illustrated below, the present invention logs three different types of information: a) when a dictionary entry was inserted (type I or "entry type I") along with its value, b) when a dictionary entry was deleted (type D or "entry type D"), and c) when a value was first masked (type V or "entry type V"). Thus, the present invention guarantees causal ordering by providing consistent results even when an entry is deleted or added.

Turning now to FIG. 5A, assume a dictionary 502 contains three values, value "A," value "B," and value "C." The first state of the dictionary may be an "initial state" or "entry state" where a chain or a chain of blocks/entries are created with the dictionary entries (e.g., entry blocks) such as, for example, entry A with type I (e.g., an initial/entry state or "state I"), entry B with type I, and entry C with type I. As used herein, the entry "type I" along with its value B indicates when the dictionary entry was inserted in the dictionary. That is, given an initial dictionary the operations records type I (e.g., for insert) entries for the various values, so that the dictionary can be reconstructed.

Assume that value "V1" is to be data masked. A hash value may be created for the value (e.g., "V1"), which may yield a large number (e.g., large numbers may be hash functions, and in particular cryptographic hash functions such as, for example, SHA-1, return values with a fixed size. In the example of SHA1 the size is 160 bits, which means a number of up to 40 digits in hexadecimal base.). The value "V1" may be data masked by applying a first hash function ("$hash_m$") to V1. Then, a modular operation (e.g., a modular of the size of the dictionary such as, for example, "3" for A, B, and C) may be performed on the masked value. That is, an index of the dictionary may be equal to the modular ("%") of $hash_m$(V1) (e.g., index=$hash_m$(V1) % dictionary size), where $hash_m$ is a hashing function used in the masking operation. The masked value may be equal to a value corresponding to a value in the dictionary at "index" position. Thus, from V1 the value of 2 may be generated. The value of "2" is then data masked using the second entry (e.g., entry/value B).

At this point, V1 is now added to the dictionary as illustrated in dictionary 504 (e.g., add another entry block in the dictionary 504) and a new entry type is indicated such as, for example, type V which indicates when the value V1 was first masked.) When the value V1 is masked for the first time the operation may record this event type within the blockchain by adding a node of type V. The node of type V contains other information along which is the result of applying the hash function $hash_b$ to the value V1. This way the real value V1 is not stored in the blockchain. It should be noted that blockchain is used herein by way of example only but event type may be stored as a transaction in a database.

The second hash function ("$hash_b$") may be a cryptographic strong hash function used for storing values in the dictionary that provides causal ordering. In this way, each entry of a masked value is maintained and stored while causally ordering each new data masked entry as illustrated in dictionary 504, which depicts data masked V1 being appended to the initial dictionary 502. It should be noted that the two hash functions (e.g., $hash_m$ and $hash_b$) may be used such that the second hash function ("$hash_b$") may be exposed to the public and conceal or protect the internal hash function (e.g., $hash_m$). That is, $hash_b$ may be public to enable all the workers to operate on the blockchain staring I, D, and V enteries.

Assume now a new dictionary entry (e.g., entry "D") is to be added to the dictionary 504 as illustrated in FIG. 5B. At this point, dictionary 504 has four entry blocks: entry A with type I, entry B with type I, entry C with type I, entry V1 with type V. Entry D with type I may be added to dictionary 504 as illustrated in dictionary 506. Thus, dictionary 506 illustrates having 5 blocks. Type I is used when encountering a new entry previously not seen in the dictionary. The entry D with type I records the event of the insertion of the value D in the dictionary and it records that it happened after that V1 has been masked.

Assume now that value V2 is desired or intended for data masking (which is not a dictionary or a value that has been observed/seen previously). Similar to the operations described in FIG. 5A, a modular operation ("%") (e.g., a modular of the size of the dictionary such as, for example, "3" for A, B, and C) may be performed on the masked value V2. That is, an index of the dictionary may be equal to the modular of $hash_m$(V2) (e.g., index=$hash_m$(V2) % dictionary size), where $hash_m$ is a hashing function used in the masking operation. The masked value may be equal to the size of the dictionary index.

The dictionary 506 may be reconstructed from chain 2 so dictionary equals [A, B, C, D] and dictionary size may be equal to four ("4"). Since there is no entry of type V with the value V2, the entire chain may be traversed. A type V entry may be added to remember when V2 was masked for the first time, which is now illustrated as dictionary 508. It should be noted that the difference between entries of type V, and I and D is that V records indicated when a value was masked for the first time, while I and D records are indication of events that modify the dictionary and inserting and deleting elements, respectively.

Turning now to FIG. 5C, assume it is desired to mask value V1 again using dictionary 508 illustrated with blocks 1-6 (e.g., a blockchain of blocks/nodes 1-6). The dictionary may be reconstruction from first three chains: entry blocks: entry A with type I, entry B with type I, entry C with type I. Since a V action with the value V1 has been previously observed within a block (e.g., block 4), the block chain may be traversed until the V action is encountered at block 4. From a reconstruction operation, the dictionary is A, B, and C (e.g., dictionary=[A, B, C]) and dictionary size is 3, which are the same values as the first masking application of V1 of FIG. 5A. As such, there is no need to add a type V action since there is already a value (e.g., V1) for the V action.

Assume, now that it is desired to mask value V2 again. Again, the dictionary is reconstructed from the first three chains: entry blocks: entry A with type I, entry B with type I, entry C with type I. Since a V action with the value V2 has been previously observed within a block (e.g., block 6), the block chain may be traversed until the entry of type V action is encountered at block 6. From a reconstruction operation, the dictionary is A, B, C, and D (e.g., dictionary [A, B, C, D]) and dictionary size is 4, which are the same values as the first masking application of V2 of FIG. 5B. As such, there is no need add a type V entry since there is already a value (e.g., V2) for the entry of type V.

Figure 6:
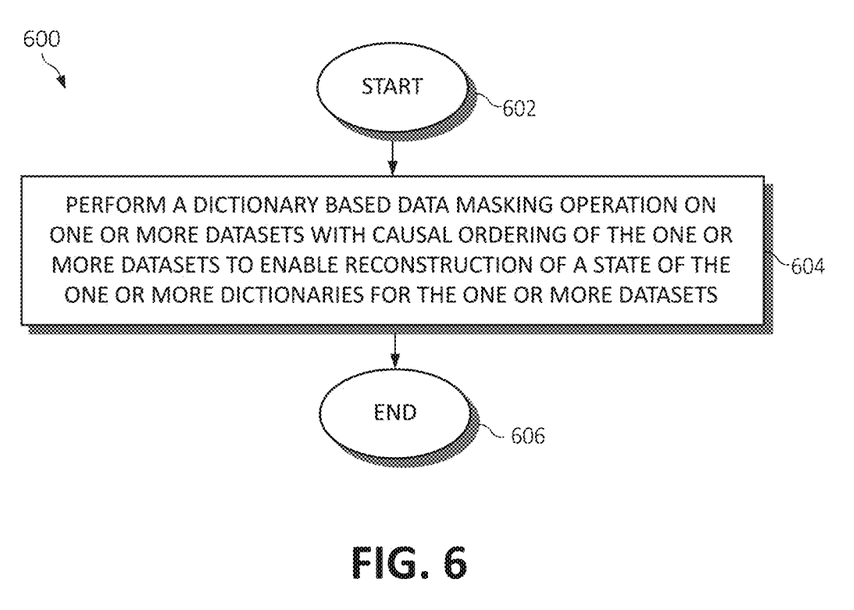
FIG. 6 is a flowchart diagram depicting an exemplary method for performing consistent data masking in a distributed computing environment by a processor, again in which aspects of the present invention may be realized.

FIG. 6 is a flowchart diagram depicting an exemplary method for performing consistent data masking in a distributed computing environment. The functionality 600 may be implemented as a method executed as instructions on a machine, where the instructions are included on at least one computer readable medium or one non-transitory machine-readable storage medium. The functionality 600 may start in block 602.

A dictionary based data masking operation may be performed on one or more datasets with causal ordering of the one or more datasets to enable reconstruction of a state of the one or more dictionaries for the one or more datasets, as in block 604. The functionality 600 may end, as in block 606.

Figure 7:
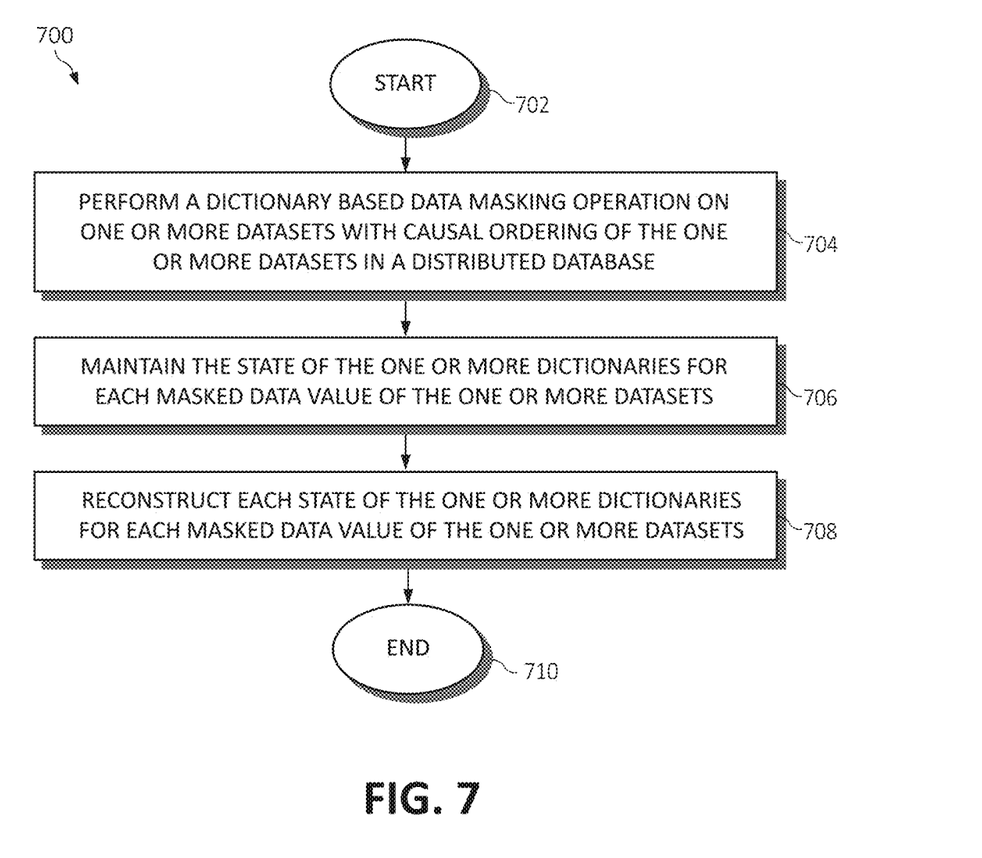
FIG. 7 is a flowchart diagram depicting an exemplary method for performing consistent data masking in a distributed computing environment by a processor, again in which aspects of the present invention may be realized.

FIG. 7 is a flowchart diagram depicting an exemplary method for performing consistent data masking in a distributed computing environment. The functionality 700 may be implemented as a method executed as instructions on a machine, where the instructions are included on at least one computer readable medium or one non-transitory machine-readable storage medium. The functionality 700 may start in block 702.

A dictionary based data masking operation may be performed on one or more datasets with causal ordering of the one or more datasets in a distributed database, as in block 704. A state of each of one or more dictionaries for each masked data value of the one or more datasets may be maintained, as in block 706. Each state of the one or more dictionaries may be reconstructed for each masked data value of the one or more datasets, as in block 708. The functionality 700 may end, as in block 710.

In one aspect, in conjunction with and/or as part of at least one block of FIGS. 6-7, the operations of methods 600 and/or 700 may include each of the following. The operations of methods 600 and/or 700 may maintain the state of the one or more dictionaries for each masked data value of the one or more datasets and/or maintain for each of the one or more datasets in the one or more dictionaries a dictionary entry along with an associated data masking value, each deletion of the dictionary entry of the one or more datasets, the data masking value for each one of the one or more datasets indicating a time period of the data masking, or a combination thereof. The operations of methods 600 and/or 700 may reconstruct each state of the one or more dictionaries for each masked data value of the one or more datasets.

The operations of methods 600 and/or 700 may reconstruct each state of the one or more dictionaries according to a dictionary entry in the one or more dictionaries along with an associated data masking value for each of the one or more datasets, each deletion of the dictionary entry of the one or more datasets, and the data masking value for each one of the one or more datasets indicating a time period of the data masking. The operations of methods 600 and/or 700 may store each masked data value in the one or more dictionaries as a cryptographic hash function. The one or more dictionaries are transaction ledgers. The operations of methods 600 and/or 700 may use a blockchain system for performing the dictionary based data masking operation on the one or more datasets with causal ordering of the one or more datasets.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for performing consistent data masking in a distributed computing environment, comprising:
    performing a dictionary based data masking operation on one or more datasets with causal ordering of the one or more datasets to enable reconstruction of a state of one or more dictionaries for the one or more datasets; and
    maintaining the state of the one or more dictionaries for the one or more datasets to facilitate the reconstruction, wherein maintaining the state includes maintaining, for each of the one or more datasets in the one or more dictionaries, a dictionary entry having an associated data masking value, each deletion of the dictionary entry of the one or more datasets, and the data masking value for each one of the one or more datasets indicating a time period of the data masking.

2. The method of claim 1, further including reconstructing each state of the one or more dictionaries for each masked data value of the one or more datasets.

3. The method of claim 1, further including reconstructing each state of the one or more dictionaries according to the dictionary entry in the one or more dictionaries along with the associated data masking value for each of the one or more datasets, each deletion of the dictionary entry of the one or more datasets, and the data masking value for each one of the one or more datasets indicating the time period of the data masking.

4. The method of claim 1, further including storing each masked data value in the one or more dictionaries as a cryptographic hash function, wherein the one or more dictionaries are transaction ledgers.

5. The method of claim 1, further including using a blockchain system for performing the dictionary based data masking operation on the one or more datasets with causal ordering of the one or more datasets.

6. A system for performing consistent data masking in a distributed computing environment, comprising:
    one or more computers with executable instructions that when executed cause the system to:
        perform a dictionary based data masking operation on one or more datasets with causal ordering of the one or more datasets to enable reconstruction of a state of one or more dictionaries for the one or more datasets; and
        maintain the state of the one or more dictionaries for the one or more datasets to facilitate the reconstruction, wherein maintaining the state includes maintaining, for each of the one or more datasets in the one or more dictionaries, a dictionary entry having an associated data masking value, each deletion of the dictionary entry of the one or more datasets, and the data masking value for each one of the one or more datasets indicating a time period of the data masking.

7. The system of claim 6, wherein the executable instructions reconstruct each state of the one or more dictionaries for each masked data value of the one or more datasets.

8. The system of claim 6, wherein the executable instructions reconstruct each state of the one or more dictionaries according to the dictionary entry in the one or more dictionaries along with the associated data masking value for each of the one or more datasets, each deletion of the dictionary entry of the one or more datasets, and the data masking value for each one of the one or more datasets indicating the time period of the data masking.

9. The system of claim 6, wherein the executable instructions store each masked data value in the one or more dictionaries as a cryptographic hash function, wherein the one or more dictionaries are transaction ledgers.

10. The system of claim 6, wherein the executable instruction use a blockchain system for performing the dictionary based data masking operation on the one or more datasets with causal ordering of the one or more datasets.

11. A computer program product for, by a processor, performing consistent data masking in a distributed computing environment, the computer program product comprising a non-transitory computer-readable storage medium having computer-readable program code portions stored therein, the computer-readable program code portions comprising:
    an executable portion that performs a dictionary based data masking operation on one or more datasets with causal ordering of the one or more datasets to enable reconstruction of a state of one or more dictionaries for the one or more datasets; and
    an executable portion that maintains the state of the one or more dictionaries for the one or more datasets to facilitate the reconstruction, wherein maintaining the state includes maintaining, for each of the one or more datasets in the one or more dictionaries, a dictionary entry having an associated data masking value, each deletion of the dictionary entry of the one or more datasets, and the data masking value for each one of the one or more datasets indicating a time period of the data masking.

12. The computer program product of claim 11, further including an executable portion that maintains reconstruct each state of the one or more dictionaries for each masked data value of the one or more datasets.

13. The computer program product of claim 11, further including an executable portion that reconstructs each state of the one or more dictionaries according to the dictionary entry in the one or more dictionaries along with the associated data masking value for each of the one or more datasets, each deletion of the dictionary entry of the one or more datasets, and the data masking value for each one of the one or more datasets indicating the time period of the data masking.

14. The computer program product of claim 11, further including an executable portion that:
   uses a blockchain system for performing the dictionary based data masking operation on the one or more datasets with causal ordering of the one or more datasets; and
   stores each masked data value in the one or more dictionaries as a cryptographic hash function.

\* \* \* \* \*